Dec. 30, 1969     T. A. HURTNER ET AL     3,486,204
SEAT PALLET LATCH
Filed July 26, 1967
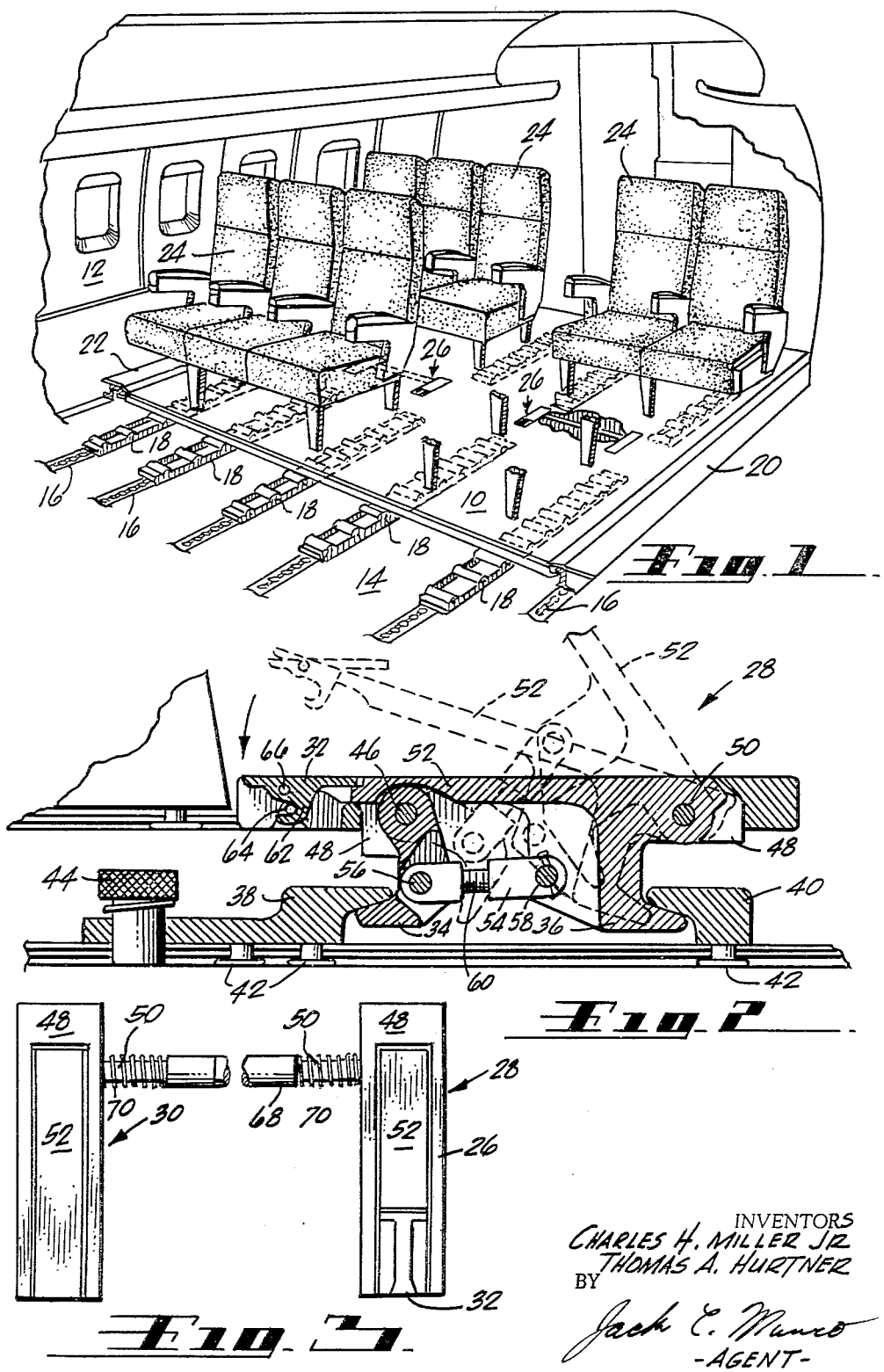
INVENTORS
CHARLES H. MILLER JR
THOMAS A. HURTNER
BY
Jack E. Munro
—AGENT—

United States Patent Office 3,486,204
Patented Dec. 30, 1969

3,486,204
SEAT PALLET LATCH
Thomas A. Hurtner, San Pedro, and Charles H. Miller, Jr., Long Beach, Calif., assignors to McDonnell Douglas Corporation, a corporation of Maryland
Filed July 26, 1967, Ser. No. 656,216
Int. Cl. A44b 21/00
U.S. Cl. 24—201                4 Claims

ABSTRACT OF THE DISCLOSURE

A pair of spaced over-center latching mechanisms connected by a torque bar to operate as a single mechanism. Each mechanism includes a pair of latching pawls which serve to align itself when latched and are adjustable to eliminate any clearance.

BACKGROUND OF INVENTION

In the general field of air transport there is a need for both the carriage of freight and for the conveyance of passengers. For this purpose it has been found to be desirable to adapt an aircraft for both freight carrying or passenger carrying as the occasion demands.

The present type of freight aircraft usually employ a cargo pallet as the basic load supporting surface. The floor of the aircraft has mounted thereon a plurality of low-friction rollers to facilitate ease of pallet movement during ingress and egress of the cargo pallet. The rollers are usually contained within a longitudinal track and each track is removably secured to the aircraft floor in one of several longitudinal rows of apertures. Using this type of aircraft cargo structure, a passenger seat pallet can be moved in and out of the aircraft in the same manner as a cargo pallet. However, certain problems become apparent in the use of the passenger seat pallet that are not wholly present in the use of the cargo pallet. First, the mechanism which latches the passenger pallet to the aircraft floor must be of sufficient strength to retain a fully occupied pallet during an emergency (crash) load. Second, this latching mechanism must be so positive in its latching action as not to permit any clearance movement of the pallet. Clearly such "play" in the pallet would be undesirable from the standpoint of passenger comfort. Third, the transformation from a cargo aircraft to a passenger aircraft must be accomplished in the shortest time possible and vice versa.

SUMMARY

This invention relates to a latching apparatus for securely retaining passenger pallets in an aircraft. Each pallet has four pairs of latching mechanisms, each pair comprising a latch located outboard adjacent the aircraft fuselage and an inboard latch located adjacent the aisle dividing the seats. Each pair of latches are connected through a torque bar so that when the inboard latch is manually operated the outboard latch is simultaneously operated.

Each of the separate latches includes a pair of pivotal pawls. The pawls are connected through an adjustable link in such a manner that an over center locking action is achieved during movement of the pawls. The pawls are biased away from each other when in the latching position. Upon movement of the latch to the unlatched position the pawls are rotatably moved in close proximity to one another.

The latching apparatus of this invention provides a latch of relatively high strength and which is adjustable in the latching action to insure that there is no latch "play." One of the main objectives of the latching mechanism of this invention is that the pallet is perfectly aligned upon latching this invention thereby not requiring that the pallet be positioned prior to latching. Another main objective is that a plurality of pallets can be installed within and removed from an aircraft in a matter of a few minutes.

BRIEF DESCRIPTION OF THE DRAWING

FIGURE 1 is a perspective view of an aircraft passenger seat pallet embodying the latching mechanism of this invention;

FIG. 2 is a side sectional view of the aisle latch of this invention; and

FIG. 3 is a plan view of the pair of latching mechanisms of this invention showing the torque bar connection therebetween.

DESCRIPTION OF THE SHOWN EMBODIMENT

Referring specifically to FIG. 1, there is shown a typical seat pallet 10 being installed within an aircraft fuselage 12. The floor 14 of the aircraft includes a plurality of spaced longitudinal tracks 16 upon which are mounted roller tracks 18. Side guides 20 and 22 are provided for the purpose of restraining the pallet 10 against transverse movement.

Each pallet 10 has fixedly attached thereto a plurality of passenger seats 24. Each pallet 10 includes at least four latching mechanisms of this invention depicted broadly as 26 (there being only two shown in FIG. 1). Generally, it has been found to be desirable to install the latching mechanisms in the longitudinal space located between the rows of seats. However, the location of the latching mechanism is a matter of design, it only being required that the pallet be restrained.

Each latching mechanism 26 includes an aisle latch 28 and an outboard latch 30. Each of the latches 28 and 30 are identical except a secondary locking means 32 is provided in latch 28 which is not necessary in latch 30. Each of the latches 28 and 30 contain latching pawls 34 and 36. The latching arrangement of the pawls 34 and 36 is such that when the pawls are separated by the greatest from each other, the latch is in the latching position. With the pawls 34 and 36 in close proximity to each other the latch is in the non-latched position. Cooperating with each of the pawls 34 and 36 are fittings 38 and 40, respectively. Although not shown in the drawing, fittings 38 and 40 are integrally connected together to form a unitary structure. The fitting arrangement 38 and 40 includes a plurality of studs 42 which are to cooperate with a track 16. Plunger 44 is provided to permit movement of the fitting arrangement 38 and 40 into and out of engagement with the track 16. This fitting arrangement 38 and 40 forms no direct part of this invention. It has only been explained to show its association with the pawls 34 and 36.

Pawl 34 is pivotally connected through a pivot pin 46 to a latching housing 48. Pawl 36 is also pivotally connected to the housing 48 through pivot pin 50. Integrally connected to pawl 36, is an arm 52. The top surface of the arm 52 is meant to lie flush with the top surface of the pallet 10 and extend longitudinally over the pawl 34. Each of the pawls 34 and 36 are connected through a link 54. Link 54 is pivotally connected to each of the pawls 34 and 36 through pivot pins 56 and 58, respectively. Also, link 54 is adjustable in length as by means of screw connection 60.

The foregoing pawl latching arrangement as previously stated, is generic to both latches 28 and 30. The only difference between latches 28 and 30 is in the addition of the secondary locking means 32. This secondary locking means 32 includes a pawl 62 and a pin 64. Pin 64 is fixedly secured to housing 48. Pawl 62 is pivotally mounted through pivoted pin 66 to arm 52. Obviously, with the pawl 62 in engagement with the pin 64 the arm 52 is prevented from movement from the latched position to the unlatched position. It is also felt to be readily apparent from the drawing that when arm 52 is in the latched position pawls 34 and 36 are biased into contact with cooperating surfaces of the fitting arrangement 38 and 40. The latching arrangement must be such that there is no movement between the pawls 34 and 36 and the fittings 38 and 40. Because no two parts can ever be made to fit perfectly, link 54 is made adjustable. Therefore, if there is any clearance between the pawls 34 and 36 and fittings 38 and 40, the link 54 is adjusted accordingly so that the exact spacing is achieved to insure that a positive latching action is obtained.

When it is desired that seat pallet 10 is to be removed from the aircraft, the following operation is effected to move pawls 34 and 36 to the unlatched position. The secondary latching mechanism 32 of each of the aisle latches is first operated to move pawl 62 out of engagement with pin 64. This is easily effected through rotating the pawl 62 counterclockwise with respect to FIG. 2 of the drawing. Now with the secondary latch not being engaged, arm 52 can be manually rotated clockwise (with respect to FIG. 2) about pivot pin 50. Such rotating movement causes pawl 36 to pivot out of engagement with fitting 40 and to be moved upwardly away from the floor 14 of the aircraft. Since the link 54 connects the pawls 36 and 34, pawl 34 is pivoted counter-clockwise about pivot pin 46 upwardly away from the floor 14 of the aircraft. The link connection 54 is installed so as to provide a slightly over-center locking action when the arm 52 is in the latched position. This over-center locking action tends to hold the pawl in the locking position at this time. Once the pawls 34 and 36 begin their pivot toward the unlatched position the over center arrangement between the pawls 34 and 26 is overcome and the pawls are moved toward each other and upward to the unlatched position.

As above-stated only the aisle latch 28 was operated. The outboard latch 30 is connected to the aisle latch through a torque bar 68. The bar 68 is connected to the pivot pins 50 of each of the latches 28 and 30. The connection to pivot pins 50 must be positive, a spline connection (not shown) has been found to be quite satisfactory. As shown in FIG. 3 torque bar 68 is permitted longitudinal adjustment with the pivot pins 50. Springs 70 are provided to take up any clearance in the connection of the torque bar 68 to the pivot pins 50 of each of the latches 28 and 30. With this arrangement it is readily apparent that as arm 52 of the aisle latch is pivoted so also is arm 52 of the outboard latch. In this manner both latches 28 and 30 operate simultaneously between the latching and unlatching position. This type of latching arrangement is desired to decrease the time required in latching and unlatching the pallet 10 by decreasing the number of latches to be operated. Also, the aisle latch is more readily accessible than the outboard latch thereby eliminating the requirement of reaching between the seats.

The various features and advantages are thought to be clear from the foregoing description. Various other features and advantages not specifically enumerated will undoubtedly occur to those versed in the art as likewise will many variations and modifications of the embodiment of the invention illustrated, all of which may be achieved without departing from the spirit and scope of the invention.

We claim:
1. A latching apparatus comprising:
a housing;
a first latching pawl being pivotally connected to said housing and capable of moving between a latched and an unlatched position, said first latching pawl having a protrusion extending in the direction of the movement of said first latching pawl from the unlatched to the latched position;
a second latching pawl being pivotally connected to said housing and capable of movement between a latched and an unlatched position, said second latching pawl having a protrusion extending in the direction of the movement of said second pawl from the unlatched to the latched position;
a base having fittings extending therefrom and in directions opposite to the directions of said protrusions, said fittings being adapted to engage said protrusions when said protrusions are in said latched position;
a link connecting said first and second latching pawls in such a manner that when said pawls are in said latched position said link tends to forcibly maintain said pawls in said latched position; and
a handle means to facilitate manual movement of said pawls to said unlatched position, said handle means being operatively associated with said second latching pawl.

2. An apparatus as defined in claim 1 wherein:
said link is adjustable whereby the distance separating said first and second pawls in said latched position is variable.

3. An apparatus as defined in claim 1 wherein:
said handle means is integrally connected to said second latching pawl.

4. An apparatus as defined in claim 1 wherein:
said link and said pawls establishing an over-center locking action when said pawls are in said latched position, and said latching pawls being separated from each other the greatest distance when in said latched position.

References Cited

UNITED STATES PATENTS

| | | | |
|---|---|---|---|
| 1,542,053 | 6/1925 | Gillies | 292—26 |
| 2,584,801 | 2/1952 | Handforth | 294—97 |
| 2,703,431 | 3/1955 | Tatom | 292—26 |
| 2,916,317 | 12/1959 | Diday | 292—26 |

BERNARD A. GELAK, Primary Examiner

U.S. Cl. X.R.

24—230; 105—369; 248—361